No. 879,746. PATENTED FEB. 18, 1908.
A. COTTOM.
NUT LOCK.
APPLICATION FILED APR. 30, 1907.
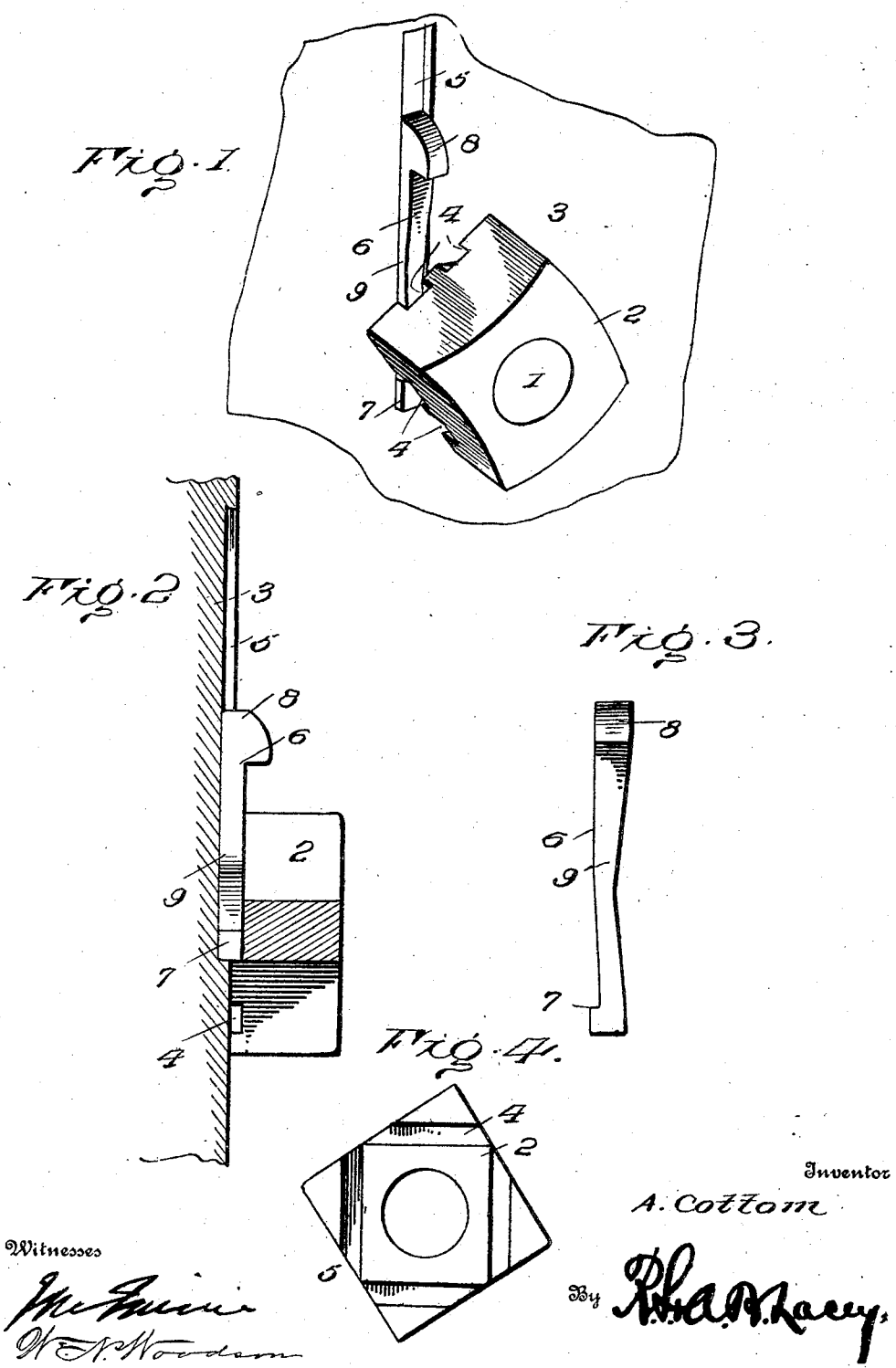
Witnesses
Inventor
A. Cottom
By
Attorneys

UNITED STATES PATENT OFFICE.

ALBERT COTTOM, OF CHILLICOTHE, IOWA.

NUT-LOCK.

No. 879,746.  Specification of Letters Patent.  Patented Feb. 18, 1908.

Application filed April 30, 1907. Serial No. 371,094.

*To all whom it may concern:*

Be it known that I, ALBERT COTTOM, citizen of the United States, residing at Chillicothe, in the county of Wapello and State of Iowa, have invented certain new and useful Improvements in Nut-Locks, of which the following is a specification.

The present invention relates to certain new and useful improvements in nut locks, and has for its object to provide a novel construction whereby the nut may be effectively locked against working loose.

The invention also aims to provide a nut lock which is peculiarly designed so that it can be readily disengaged from the nut when desired, thereby enabling the device to be employed repeatedly.

For a full understanding of the invention and the merits thereof and also to acquire a knowledge of the details of construction of the means for effecting the result, reference is to be had to the following description and accompanying drawings, in which:

Figure 1 is a perspective view of a nut lock embodying the invention; Fig. 2 is a sectional view through the same; Fig. 3 is a detail view of the locking pin; and, Fig. 4 is a bottom plan view of the nut.

Corresponding and like parts are referred to in the following description and indicated in all the views of the drawings by the same reference characters.

In the present embodiment of the invention, the numeral 1 designates a bolt of any approved construction, and 2 a nut coöperating with the threaded end of the bolt. A plate 3 is applied to the bolt 1 and engages the nut 2 when the latter is screwed inwardly. The corner portions of the nut 2 are formed with grooves 4 both ends of which open exterior of the nut and the plate 3 is provided with a groove 5 designed to register successively with the various grooves 4 as the nut 2 is turned upon the bolt 1. In the present instance the nut 2 is shown as having a square formation and is provided with four of the grooves 4, one of which is designed to register with the groove 5 at each quarter turn of the nut.

A locking key 6 operates within the groove 5, being of a thickness approximately equal to the combined depths of the groove 5 and one of the grooves 4. One end of the key 6 carries a laterally extending nose 7 designed to project outwardly beyond the grooves 4 and engage with a side of the nut to prevent withdrawal of the key, while the opposite end carries an outwardly projecting finger piece 8 constituting a convenient means for manipulating the key. The end portions of the key 6 have a width corresponding to the grooves 4 and 5, while the intermediate portion is cut away from opposite sides to form the reduced and inclined shank 9. Owing to the fact that this shank 9 is narrower than the grooves 4, the nut is permitted to have the slight rotary movement required to throw a corner thereof into engagement with the nose 7 after the key has been inserted in position. Attention may also be directed to the fact that owing to the diagonal disposition of the shank, one side thereof is normally in engagement with the outer side wall of the groove 4 throughout its entire length, thereby providing a large bearing surface. When placing the key 6 in position for the purpose of locking the nut 2, one of the grooves 4 is turned into registry with the groove 5. After the key 6 has been inserted in position so that the nose 7 impinges against one end of the groove 5 and projects beyond the groove 4, the nut is turned rearwardly until one of the faces thereof is thrown into engagement with the nose 7 and prevents withdrawal of the key. It will thus be seen that the key is locked against all longitudinal movement, and owing to the fact that the tendency of the nut is always to work loose, the same will remain in engagement with the nose until it is desired to remove the key when it can be again tightened to throw the groove 4 into perfect registry with the groove 5.

Having thus described the invention, what is claimed as new is:

1. In a nut lock, the combination of a bolt, a nut coöperating with the bolt and having a groove formed therein, both ends of the groove opening exterior of the nut, a plate receiving the bolt and provided with a groove designed to register with the groove in the nut, and a key received within the groove in the plate and designed to engage the groove in the nut to lock the latter against working loose, the said key extending entirely through the nut and being provided at one end with a laterally extending nose adapted to engage one of the exterior faces of the nut to prevent accidental displacement of the key.

2. In a nut lock, the combination of a bolt, a nut coöperating with the bolt and having a groove formed in the base thereof and opening exterior of the nut at opposite ends thereof, a plate receiving the bolt and provided with a groove designed to register with a groove in the nut, and a key received within the groove in the plate and adapted to engage the groove in the nut to lock the latter against working loose, the said key having an intermediate portion thereof cut away to form a reduced inclined shank which is somewhat smaller than the groove in the nut and permits the latter to have a slight rotary movement, a nose being formed at one end of the key and designed to project beyond the groove in the nut to engage a face of the nut and prevent accidental displacement of the key when the nut is given a slight rotary movement permitted by the reduced shank of the key.

In testimony whereof I affix my signature in presence of two witnesses.

ALBERT COTTOM. [L. S.]

Witnesses:
 C. R. WORLEY,
 SILAS WARREN.